May 8, 1962 R. L. CARLSTEDT 3,033,062
CUTTER FOR DRILLING MACHINE
Filed Aug. 18, 1959 2 Sheets-Sheet 1
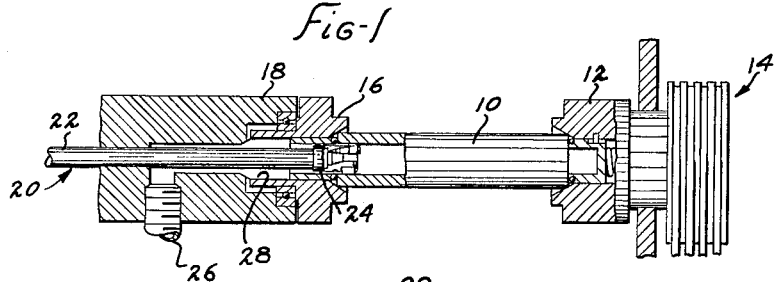
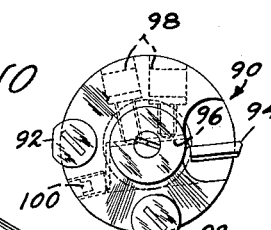
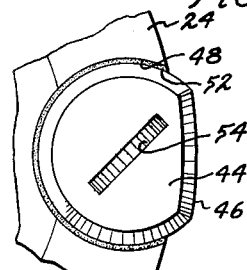
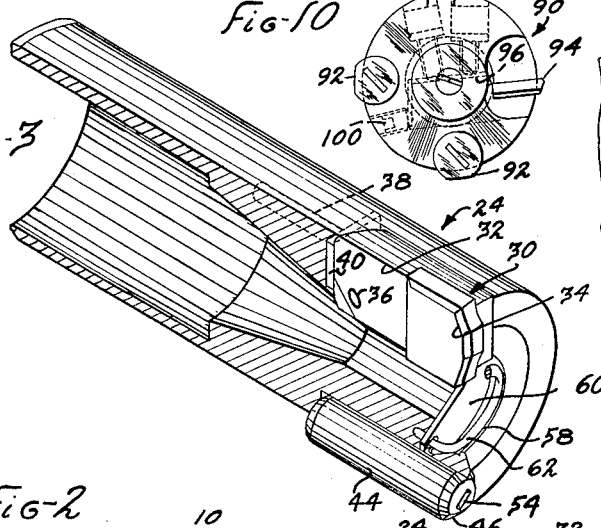
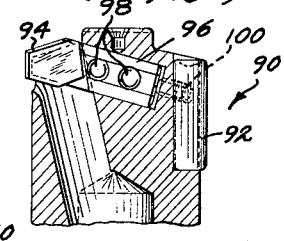
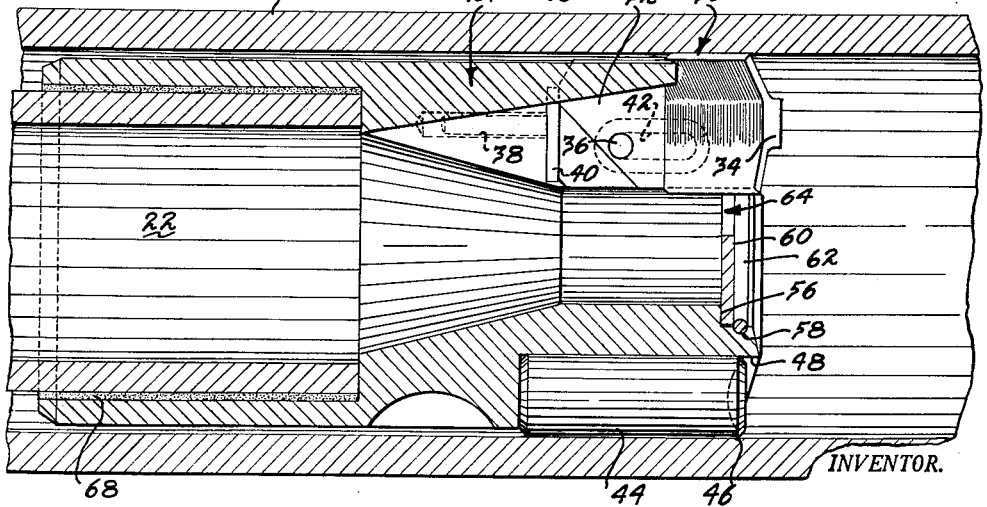
INVENTOR.
BY RAGNAR L. CARLSTEDT
Toulmin & Toulmin
ATTORNEYS May 8, 1962 R. L. CARLSTEDT 3,033,062
CUTTER FOR DRILLING MACHINE
Filed Aug. 18, 1959 2 Sheets-Sheet 2
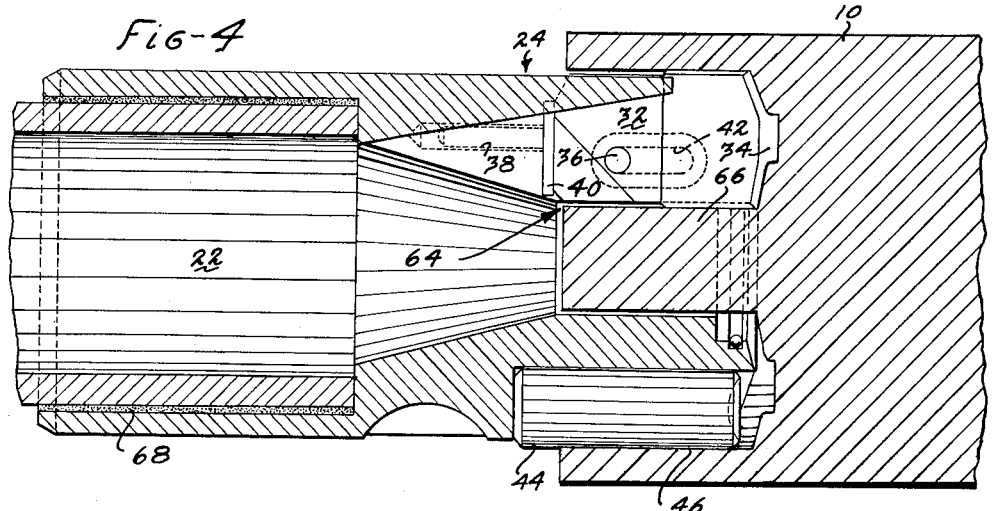
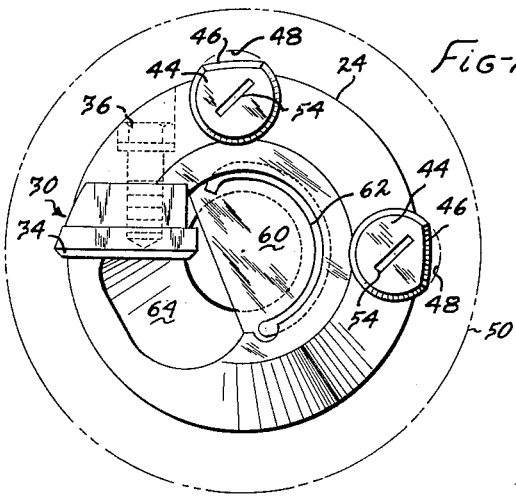
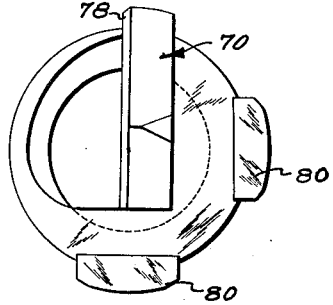
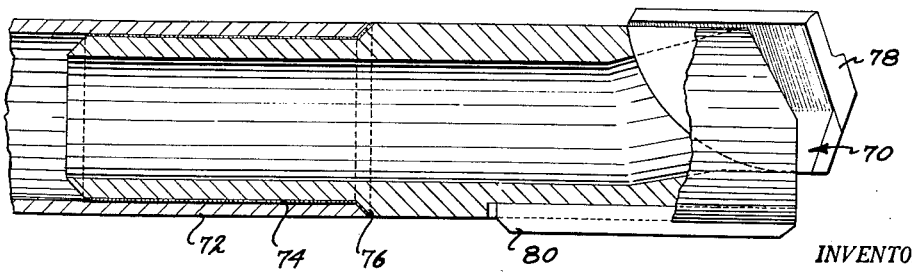
INVENTOR.
RAGNAR L. CARLSTEDT
BY Toulmin & Toulmin
ATTORNEYS

# United States Patent Office 3,033,062
Patented May 8, 1962

3,033,062
CUTTER FOR DRILLING MACHINE
Ragnar L. Carlstedt, Glenside, Pa., assignor to Peter J. Salmon Co., Inc., Glenside, Pa., a corporation of Pennsylvania
Filed Aug. 18, 1959, Ser. No. 834,540
2 Claims. (Cl. 77—69)

This invention relates to cutters for drilling machines and is particularly concerned with cutters for high speed drilling machines of the nature in which the cutter is pressed against a rotating workpiece to accomplish the drilling action.

Drilling machines of the nature with which this invention is concerned are known and are widely used for drilling deep holes such as in gun barrels and like work members. In these machines the work member to be drilled is generally mounted between a rotating spindle plate and a rotatable clamp plate so that as the spindle plate rotates the workpiece will be rotated on a predetermined axis.

A cutting tool which is preferably held against rotation is then pressed against one end of the workpiece so that a cutting action is obtained and a hole is drilled in the workpiece. A particular advantage of this drilling method is that the holes so drilled tend to be straight and true. The holes can be drilled at high speed, also, because the drilling tool can be supported on a straight tubular supporting shank with lubricant being applied along the outside of the shank and being discharged together with the chips back through the tool shank.

Since most drilling operations carried out in this manner are intended to result in extremely accurate holes, the construction of the cutting portion of the tool is quite important. The cutting portions constitute the workpiece ends of the cutting tools and are generally in the form of members detachably connected to the workpiece end of the tubular shank and which members have attached thereto the cutting element, which may, for example, be shaped carbide tools. The cutting tool element carrying member is preferably detachable from the end of the tubular tool shank so that sharpening or adjustment of the individual cutting elements can be accomplished readily. The detachability of the tubular shank from the member at the cutting end of the tool carrying the cutting elements can be accomplished readily in connection with tools for drilling relatively large holes by threading the tubular tool shank and the cutter supporting member together. This is not possible, however, where small holes are being drilled because there is not sufficient stock available on which to form such interconnecting threads without either weakening one of the tubular shank and cutter supporting member or interferring with the passage of lubricant therethrough. Accordingly, drills for small holes are thus generally made as a single unit which, of course, requires replacement of the entire unit upon failure of the cutting element.

Cutting tools of the nature referred to are utilized not only for drilling holes in solid stock but are also utilized for sizing holes and for trepanning operations wherein a rod-like core portion is removed from a bar of stock so that a hole of substantial size can be drilled therein without cutting all of the stock that is removed. In connection with most cutting tools for these operations a single cutting element on the tool is sufficient for accomplishing the cutting action and the thrust developed on the cutting element is softened by pads mounted on the cutter at the cutting end in spaced relation with the cutting elements. Since these pads bear against the side of the hole being formed, it follows that they are subjected to some wear and accordingly must be replaced at times in order to maintain the desired accuracy.

A particular object of the present invention is the provision of a greatly improved cutting tool for drilling machines of the nature referred to.

Another object of this invention is the provision of a cutting tool for drilling machines of the type discussed in which the cutting element is supported in a member that is detachable from the tubular shank of the tool but in which the detachable connection between the member and shank can be accomplished without weakening the combination and without restricting the passage of coolant therethrough.

A still further object of this invention is the provision of a cutting tool for a drilling machine of the nature referred to in which the wear pads that cooperate with the cutting element to size the hole being drilled can be restored to accuracy quite simply and without entirely replacing the cutting pads.

It is also an object of this invention to provide a cutting tool for deep hole drilling for machines which can be used for not only drilling and hole sizing operations but also for trepanning.

A still further object of this invention is the provision of a cutting tool for deep hole drilling machines that provides improved and more solid support for the cutting element portion thereof.

A still further object of this invention is the provision of a cutting tool for deep hole drilling machines that provides improved and more solid support for the cutting element portion thereof.

Still another object of this invention is the provision of a cutting tool for a deep hole drilling machine in which the cutting element is extremely solidly supported but wherein the cutting element can readily be adjusted in the cutting tool.

These and other objects and advantages will become more apparent upon reference to the drawings in which:

FIGURE 1 is a diagrammatic view showing a drilling machine according to the preesnt invention;

FIGURE 2 is a sectional view drawn at enlarged scale showing one cutting tool according to the present invention with the cutting tool being employed for a hole sizing operation;

FIGURE 3 is a perspective view showing the member that attaches to the tubular tool shank and which member carries the tool element and the wear pads associated therewith;

FIGURE 4 is a view like FIGURE 2 but shows the cutter being employed for a trepanning operation;

FIGURE 5 is an end view of the cutter showing the construction thereof and also illustrates certain steps in the process of the production of the cutter;

FIGURE 6 is a fragmentary view drawn at enlarged scale illustrating the manner in which the wear pads are secured to the cutting element supporting member for selective adjustability therein;

FIGURE 7 is a sectional view showing a cutter for drilling small holes drawn at greatly enlarged scale showing the manner of connecting the tubular shank to the member that supports the cutting element;

FIGURE 8 is an end view of the cutter of FIGURE 7;

FIGURE 9 is a sectional view showing a modified form of member for a hole sizing operation illustrating the manner in which the cutting element is supported in the member; and FIGURE 10 is an end view of the cutter of FIGURE 9.

Referring to the drawings somewhat more in detail, FIGURE 1 diagrammatically illustrates a boring machine especially adapted for utilizing cutting tools according to this invention and for drilling or sizing deep holes or for carrying out trepanning operations.

In FIGURE 1 workpiece 10 has one end engaged by a spindle plate 12 rotatably supported in the frame of the machine and adapted for being driven in rotation by drive means 14 which may comprise V belts.

The end of workpiece 10 opposite spindle plate 12 is engaged by a clamp plate 16 rotatably supported in a clamp slide 18 that can be moved to bring plate 16 into pressure engagement with the end of the workpiece so that as the spindle 12 is driven in rotation, the workpiece 10 will also be rotated.

Extending sealingly through clamp 18 and clamp plate 16 on the axis of rotation of workpiece 10 is a cutting tool generally indicated at 20 and which comprises a tubular shank portion 22 and head member 24 attached thereto and which head member carries the cutting element that accomplishes the actual cutting of the workpiece.

A conduit 26 communicates with a cavity 28 in the clamp surrounding the cutting tool and coolant under extremely high pressure is supplied through conduit 26 so that it flows through cavity 28 along the outside of the cutting tool to the cutting end thereof and thence backwardly through the hollow shank of the cutting tool to a point of discharge, usually a sump and filler combination from which the coolant is returned through a pump to conduit 26.

The coolant has the effect of cooling the cutting element and flushing away the chips taken thereby while damping vibrations of the cutting tool and stabilizing the operation thereof.

The cutting tool illustrated in FIGURE 1 is shown more in detail in FIGURES 2 through 6 wherein it will be seen that the head member 24 is hollow so that the hollow interior of shank 22 can receive the coolant that is forced along the outside of the cutting tool and past the cutting element thereof.

In FIGURES 2 and 3 the cutting element is indicated at 30 and comprises steel holder 32 having cemented or brazed thereto a carbide cutter portion 34. The holder 32 is received in a slot in the head 24 and is attached thereto by a cap screw 36. According to the present invention the bottom of the slot is provided wtih a drilled hole for receiving shank 38 of spacer member that has a head 40. The head of the spacer member provides a surface against which the cutting element can bottom so that it is solidly supported during trepanning operations. By availing of shims the bottom provided by the spacer member can be varied to accommodate for cutter elements of different sizes or so that the cutter member can be moved outwardly in its supporting slot as it is sharpened. To this end the cap screw 36 extends through a slot 42 in the head member to provide for the axial adjustability of the cutting element and its supporting body.

Arranged in circumferentially spaced relation to the cutter element are the wear pads 44 which, as will be seen in FIGURE 5 are in the form of cylindrical rods having their hole engaging side round off as at 46. These pads surround the lateral thrusts imposed on the head end of the drilling tool by the cutting action being carried out. As will be seen in FIGURE 5 the cylindrical recesses in which the pads 44 are mounted are provided by drilling holes 48 in a cylindrical member from which the head 24 is made. This member originally is of the size indicated by the dot-dash outline 50 so that the holes for the pads 44 can readily be formed therein by ordinary drilling procedures.

After these holes are drilled and any other machining done if desired the head member is turned down to the size indicated so that when the pads 44 are put in place they will project outwardly as illustrated. These pads then have the surfaces 46 formed thereon preferably by grinding.

A feature of the present invention is to be found in the manner of mounting the pads in the head member. This is accomplished, as indicated in FIGURE 6 by cementing or soldering the pads in place which is shown by the thin line 52. This thickness is, of course exaggerated since the difference between the pad diameters and the diameters of their holes need only be sufficient to provide for a loose slip fit of the pads in the holes. The cementing material at 52, whether it be plastic or solder, is such a nature that it will soften upon being heated so that when the pads become worn to the extent that new pad surfaces must be provided, the cutter head can be heated and the slots 54 availed of for turning the pads to bring out a new surface that can be ground to provide a new pad surface. Depending on the size of the surfaces 46, the pads 44 can be thus rotatably adjusted three or more times to bring up new surfaces.

Another feature of the present invention is in the construction of the head so that the cutter of FIGURES 2 through 6 can be utilized for hole sizing or for trepanning. This is accomplished by forming the bore through the head at the outer end with a shoulder 56 and an annular recess 58. The shoulder 56 is adapted for receiving a plate 60 and the recess 58 is adapted for receiving a retaining snap wire 62. The plate 60 is of such a size as will be seen in FIGURE 5, that it restricts the opening for the coolant to return through the cutting tool to the opening indicated at 64. When the tool is used for hole sizing the plate is put in place and this restricts the discharge of coolant so that ample coolant pressure is maintained at all times at the cutting element. The tool is illustrated in hole sizing operation in FIGURE 2.

When the tool is to be used for trepanning operation, the plate is removed and the core 66 taken by the tool can be received through the central bore in the head and the shank of the cutting tool. During this operation the coolant will continue to flow principally through the opening 64 back into the hollow cutting tool.

With the tool illustrated in FIGURES 2 through 6 sufficient stock is available on the hollow shank and the head to permit the two members to be threaded together but it is within the purview of this invention to connect these members by cementing material as indicated at 68 which is heat softenable so that the head can be removed from the shank merely by applying heat as with a torch.

This permits the head readily to be removed or installed on the shank which can readily be done without removing the cutter from the drilling machine.

This manner of attaching the hollow shank to the head of the cutting tool is best applied to extremely small cutters of the nature illustrated in FIGURES 7 and 8 and which cutter may be for the purpose of drilling holes which may ¼" in diameter or smaller. With drills of this size it is at the present time necessary to replace the entire drilling tool whenever the cutting element becomes dulled or broken. By detachably connecting the head to the hollow shank according to this invention this is no longer necessary and it is possible merely to remove the head by heating the head end of the hollow shank and then to replace the head. In FIGURE 7 the head is indicated at 70 and the hollow shank at 72 and the connection material which may be a heat softenable plastic or solder is indicated at 74. One of the co-operating shoulders 76 formed on the head and the shank provide for accurate locating of the head on the shank in cooperation with the portions of the head and shank which telescope in relatively close fitting relation.

The cutter illustrated in FIGURES 7 and 8 is provided for carrying out solid drilling operations and the cutting element 78 accordingly extends somewhat more then half across the end of the cutter. Pads 80 are provided for softening lateral thrusts on the cutting tool.

FIGURE 9 illustrates a cutter having a head 90 that has pads 92 thereon in accordance with the mounting of the pads 44 in the first described modification. The FIGURES 9 and 10 tool is for hole sizing operations only and therefore has a cutting element that extends out laterally and toward the end. This cutting element 94 is mounted on a body or holder 96 and which holder extends into a bore formed in head 90 at an angle. Cap screws 98 clamp the body of the cutting element in place by jamming it against one side of the bore and a back up screw 100 abuts the bottom of the body thus fixedly holding the cutting element in position in the head. This gives an unusually solid support for the cutting element and permits ready changing thereof.

In all of the modifications illustrated the mouting of the carbide cutting element is such that the maximum amount of material is retained in the head of the cutting tool. The material of the head is much tougher than the carbide and this makes the tools extremely strong so that they can be operated at high speed and under high thrusts to carry out extremely rapid cutting operations without breaking as has heretofore been the case where the carbide portions of the cutting tools have been substantially larger.

I claim:

1. In a cutter for a drilling machine; a body part having a bore therethrough to receive a core when the cutter is used for trepanning, a cutting element on the end of the body part extending from the side of the bore to beyond the side of the body part, wear pads in the form of cylindrical rods arranged in circumferentially spaced relation to said cutting element, said bore having an end portion flared out at the leading side of the cutting element to receive coolant and chips during a drilling operation, a shoulder in the end of the bore, a plate adapted for engaging said shoulder while exposing said flared out portion of the bore, and a snap ring for holding said plate in place for hole sizing operations and removed for trepanning operations.

2. In a cutter for a drilling machine as set out in claim 1, and wherein the cutting element is attached to a head member disposed in an elongated tubular shank portion of the body part, and said tubular shank portion being bonded to said head member by heat softenable cement for separation of said head member from said shank portion by the application of heat.

References Cited in the file of this patent

UNITED STATES PATENTS

| | | |
|---|---|---|
| 534,009 | Pratt | Feb. 12, 1895 |
| 1,341,565 | Krepps | May 25, 1920 |
| 2,606,464 | Fleischer | Aug. 12, 1952 |
| 2,741,936 | Wohlfahrt | Apr. 17, 1956 |
| 2,882,765 | Andereasson | Apr. 21, 1959 |